Aug. 11, 1964 J. B. PUGERUD 3,144,613
BIPOLAR SIGNAL RECEIVER WITH INPUT AND OUTPUT
NON-LINEAR LIMITING MEANS WITH
INTERCONNECTING FEEDBACK
Filed March 23, 1960 2 Sheets-Sheet 1

INVENTOR
JOHN BERNT PUGERUD
BY Hane and Nydick
ATTORNEYS

Aug. 11, 1964 J. B. PUGERUD 3,144,613

BIPOLAR SIGNAL RECEIVER WITH INPUT AND OUTPUT NON-LINEAR LIMITING MEANS WITH INTERCONNECTING FEEDBACK

Filed March 23, 1960 2 Sheets-Sheet 2

INVENTOR
JOHN BERNT PUGERUD
BY Hane and Nydick
ATTORNEYS

United States Patent Office 3,144,613

Patented Aug. 11, 1964

3,144,613

BIPOLAR SIGNAL RECEIVER WITH INPUT AND OUTPUT NON-LINEAR LIMITING MEANS WITH INTERCONNECTING FEEDBACK

John Bernt Pugerud, Stockholm, Sweden, assignor to Telefonaktiebolaget L M Ericsson, Stockholm, Sweden, a corporation of Sweden Filed Mar. 23, 1960, Ser. No. 17,088
Claims priority, application Sweden Apr. 1, 1959
8 Claims. (Cl. 328—172)

The present invention relates to a signal receiver for bipolar signals, and especially a signal receiver of the type that operates according to the limiting principle.

Previously known signal receivers of this kind have the disadvantage that they generally require a rather great number of circuit elements and thus become complicated and expensive for proper functioning. The purpose of the present invention is therefore to obtain a simplified signal receiver which requires considerably fewer circuit elements, but neverthless gives the same protection against false operations and signal imitations, and especially the kind of signal imitation which is due to sub-harmonics of the signal frequency appearing in the speech at signal receivers which operate according to the limiting principle.

The signal receiver according to the invention is mainly characterized by such a relation between the signal potential and signal relay current that the current-potential charatceristic representing this relation shows a sharply marked knee at a signal potential level at which the signal relay current below said knee is substantially equal to zero, but above said knee increases rapidly to a value which causes reliable operation of the signal relay.

The invention will be further described in connection with the accompanying drawings, wherein.

Figure 1:
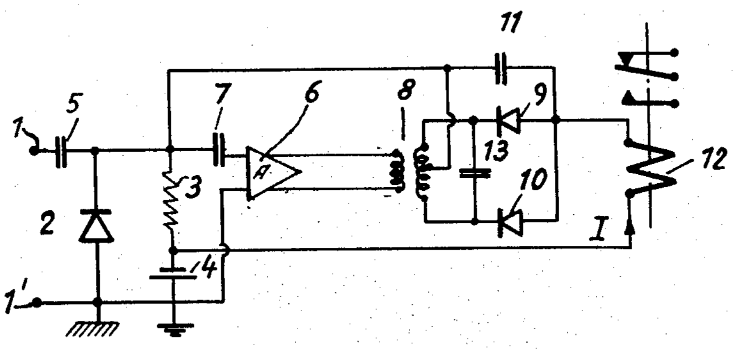
FIG. 1 shows an embodiment of a signal receiver according to the invention, suitable for practical use.

In FIG. 1, the input terminals 1 and 1′ of the signal receiver are connected to the alternating voltage source in question through a limiting stage (not shown), the purpose of which is to suppress a weak component of the tone-signaling frequency when other potentials of the speech range are simultaneously present. The input terminals are connected in parallel with a diode 2 and also with a resistance means 3 and a direct current source 4 connected in series. A blocking condenser 5 may be connected in series with one of the input terminals. The input side of an amplifier 6 is connected in parallel with the network 3, 4 and in series with a second coupling condenser 7. The output side of the amplifier is connected to one winding of a transformer 8, the second winding of which has a center tap and the end terminals of which are connected to the cathodes of diodes 9 and 10, respectively. The anodes of the diodes are interconnected and also connected to the center tap of the second transformer winding and to the input side of the amplifier 6 through a condenser 11. The anodes of the diodes 9 and 10 are furthermore connected to one end of a relay coil 12, the other end of which is connected to the connection point between the resistance means 3 and the potential source 4. The second transformer winding may be connected in parallel with a tuning condenser 13, but the system will also operate without tuning.

Figure 2:
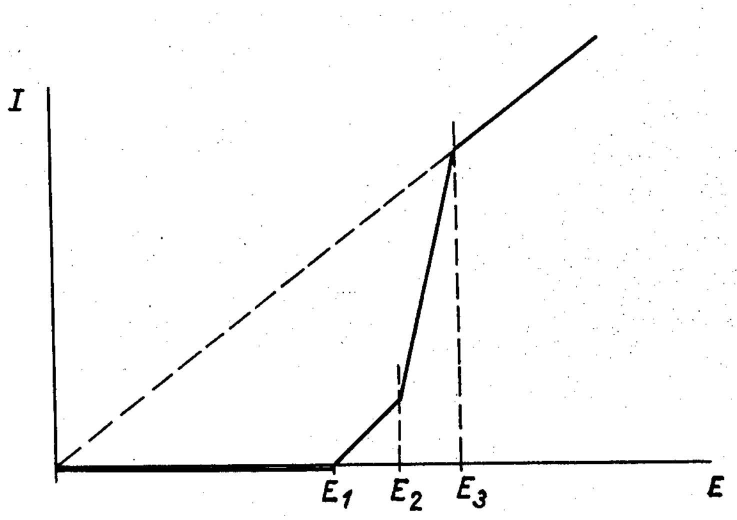
FIG. 2 shows the signal-potential-relay-characteristic obtained with the receiver according to FIG. 1.

With the connection of the potential source 4 as shown in FIG. 1, a current is obtained in the pass direction of the diode 2 in the absence of an input signal, while a back potential is created over the diodes 9 and 10, said back potential being equal to the potential over the resistance means 3. With a small input potential the diode will be attenuating, which results in a relay current that is substantially equal to zero (in reality, slightly negative); see FIG. 2. Furthermore, the input signal must overcome the back potential over the diodes 9 and 10 after amplification in the amplifier 6 in order to produce a relay current. As appears from FIG. 2, which shows the relay current as a function of the input potential, the curve has a sharply marked knee at a potential $E_1$. The current is substantially zero at a potential less than the potential $E_1$, but increases rapidly above said potential. The limit potential thus represents the potential level of the input potential at which the back potential through the diodes 9 and 10 is overcome and these diodes thus become conductive. As can be seen, the curve has another knee indicating the potential $E_2$, at which the diode 2 is blocked and its attenuating influence on the input potential ceases. With the above-described system, the relay 12 will thus obtain positive current first at potential level $E_1$ (FIG. 2), whereby a good security margin against false operations is obtainable by correctly dimensioning the elements of the connection; that is, so that the potential level of the normally appearing disturbance signals is well below said knee potential $E_1$. If the operation limit of the relay 12 is chosen at a current level which substantially exceeds the current value corresponding to the potential $E_1$, a signal receiver is attained which gives good security against false operations and which prevents operations owing to sub-harmonics of the signal frequency appearing in the speech. The mutual positions of the two knee potentials $E_1$ and $E_2$ are determined by the dimensioning of the elements and the bias voltages included in the arrangement according to FIG. 1, and also by the steepness of the curve between the potentials $E_2$ and $E_3$. Thus, it is possible to cause potentials $E_1$ and $E_2$ practically to coincide, and also to increase the steepness of the curve whereby $E_3$ approaches $E_1$ and $E_2$.

Figure 3:
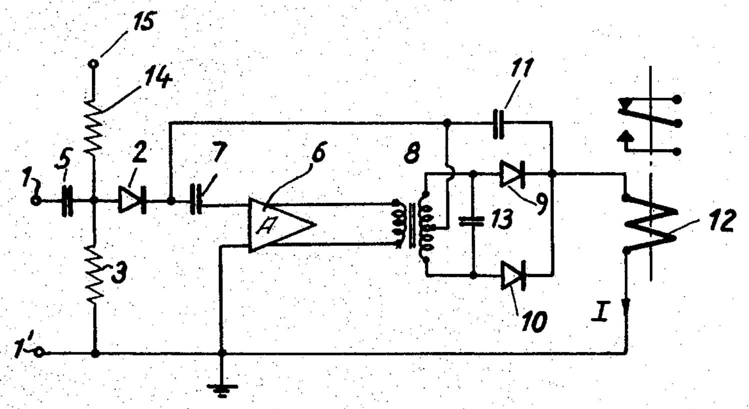
FIG. 3 shows a modified embodiment of the signal receiver according to the invention.

FIG. 3 shows a modified embodiment of the signal receiver according to FIG. 1. These two figures have certain circuit components in common, and the corresponding components are given the same reference numerals. The system according to FIG. 3 differs from that of FIG. 1 in that the diodes 9 and 10 have changed polarity and the series network 3, 4 is omitted and replaced by a potential divider comprising two mutually series-connected resistance means 3 and 14. Resistance means 3 is connected to ground, and resistance means 14 is connected to a bias source 15. The diode 2 is connected between the connection point between the two resistances 3 and 14 and to one input terminal of the amplifier 6 in series with the coupling condenser 7.

Figure 4:
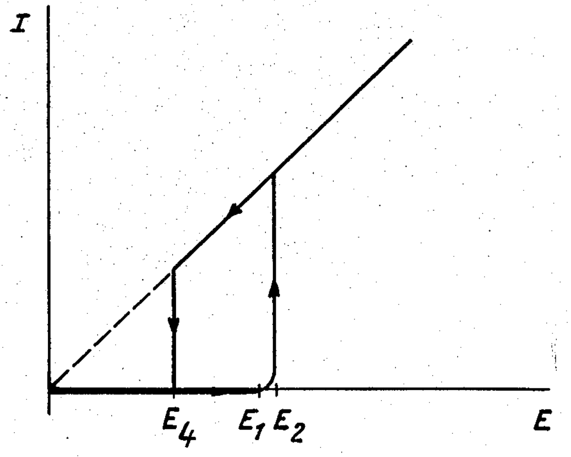
FIG. 4 shows the current potential characteristic obtained with the system according to FIG. 3.

In this system all the diodes obtain negative bias potential through the potenial divider 3, 14, and are therefore normally blocked. An input signal is attenuated by the diode 2, and after amplification in the amplifier 6 it must overcome the back potential over the diodes 9 and 10. At a certain level of the input signal the back potential is neutralized so that these diodes become conductive, and practically simultaneously the diode 2 will be conductive when the circuit elements and bias voltages in the connection are suitably dimensioned. When the diode 2 becomes conductive, the relay current suddenly increases from a value substantially equal to zero to a non-attenuated value (see FIG. 4). In this figure, $E_1$ indicates the potential level at which the diodes 9 and 10 become conductive, and $E_2$ the level at which the diode 2 becomes conductive and its attenuating influence thus ceases. With such dimensioning, the entire current potential characteristic obtains the same appearance as a hysteresis curve, which means that the relay, when it has operated due to a rise of the potential above the limit potential $E_2$, will release at a potential level $E_4$ that is below $E_2$. A characteristic similar to the one in FIG. 4 can also be obtained with the system according to FIG. 1 by dimensioning of the components; that is, so that sharply marked limits appear at operation and at release of the relay. As a result, operations of the relay due to potentials below said operation level are effectively prevented. The dimensioning determines also the mutual positions for the potentials $E_2$ and $E_4$, whereby the distances between them can be varied as desired, and they can of course also be brought to coincide, if suitable.

The invention is of course not restricted to the embodiments shown in the drawings, but may be varied in respect to the detailed construction of the apparatus without departing from the scope of the invention.

I claim:

1. A signal receiver for bipolar signals, said signal receiver comprising amplifier means including at least one input circuit and one output circuit and a signal-limiting means, said signal-limiting means comprising a first and a second current-controlling means, the first one of said current-controlling means being connected to said output circuit and including a first and a second non-linear conductive element oppositely connected in series across said output circuit, the second of said current-controlling means being connected to said input circuit and including a third non-linear conductive element and an impedance means connected in circuit with said third non-linear conductive element, a biasing potential obtained across said impedance means being connected to said third non-linear conductive element, said potential having a value causing said third non-linear conductive element to control an input signal fed to said amplifier means when said input signal voltage is below a first signal level, said first and second non-linear conductive elements being connected to said impedance means to be blocked by a potential due to a direct current passing through said impedance means, and a direct current connection between said output circuit and the connecting point of said third non-linear conductive element and said impedance means to overcome the bias potential on said third non-linear conductive element when the input signal voltage reaches a second signal level.

2. A signal receiver for bipolar signals, said signal receiver comprising an amplifier having at least one input circuit and one output circuit and a signaling-limiting means, said signal-limiting means comprising a first and a second current-controlling means, the first one of said current-controlling means being connected to said output circuit and including a first and a second non-linear conductive element oppositely connected in series across said output circuit, a source of biasing potential connected to said first and second non-linear conductive elements, said potential having a value sufficient to block a flow of current in said output circuit when an output signal voltage fed to said input circuit is below a first signal level, the second of said current-controlling means being connected to said input circuit and including a third non-linear conductive element and an impedance means connected to each other, said third non-linear conductive element being connected in series with said biasing potential, said biasing potential rendering said third non-linear conductive element conducting when the input signal voltage is below a second signal level, whereby the input signal is attenuated, a direct current connection between said output circuit and the connecting point of said third non-linear conductive element in said impedance means, to render said third non-linear conductive element non-conducting at said second signal level.

3. A signal receiver as set forth in claim 1 wherein said first and second non-linear conductive elements are crystal diodes.

4. A signal receiver as set forth in claim 1 wherein a current-sensitive device is connected to and responsive to current flowing in said first and second non-linear conducting elements.

5. A signal receiver as set forth in claim 2 wherein the output circuit of said amplifier includes a tuned circuit and said first and second non-linear conductive elements are connected in series across said tuned circuit.

6. A signal receiver as set forth in claim 5 wherein said tuned circuit includes a primary winding and a secondary winding of a transformer.

7. A signal receiver as set forth in claim 2 wherein said third non-linear conductive element is connected in shunt with the input circuit of said amplifier.

8. A signal receiver as set forth in claim 2 wherein the current flowing in said first and second non-linear conductive elements is coupled to the input circuit of said amplifier, said circuit being substantially zero for the first signal level of the input signal voltage and having substantially a fast increasing value toward the second signal level.

References Cited in the file of this patent

UNITED STATES PATENTS

| | | |
|---|---|---|
| 2,758,205 | Lubkin | Aug. 7, 1956 |
| 2,773,222 | Chauvin | Dec. 4, 1956 |
| 2,801,374 | Svala | July 30, 1957 |
| 2,816,262 | Elliott | Dec. 10, 1957 |
| 2,866,106 | Schuh | Dec. 23, 1958 |